US012769670B2

(12) United States Patent
Ostapenko et al.

(10) Patent No.: US 12,769,670 B2
(45) Date of Patent: Oct. 20, 2026

(54) MEMORY DEVICE AND SYSTEM FOR PERFORMING ADDRESS TRANSLATION USING MULTIPLE PAGE SIZES

(71) Applicant: SAMSUNG ELECTRONICS CO., LTD., Suwon-si (KR)

(72) Inventors: Maksim Ostapenko, Suwon-si (KR); Youngsam Shin, Suwon-si (KR); Deok Jae Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/969,835

(22) Filed: Dec. 5, 2024

(65) Prior Publication Data

US 2025/0190361 A1 Jun. 12, 2025

(30) Foreign Application Priority Data

Dec. 7, 2023 (KR) ........................ 10-2023-0176492

(51) Int. Cl.
*G06F 12/1027* (2016.01)
*G06F 12/1009* (2016.01)

(52) U.S. Cl.
CPC ...... *G06F 12/1027* (2013.01); *G06F 12/1009* (2013.01)

(58) Field of Classification Search
CPC ............. G06F 12/1027; G06F 12/1009; G06F 3/0658; G06F 12/06; G06F 13/4221; G06F 2212/68; G06F 2212/7201
See application file for complete search history.

(56) References Cited

U.S. PATENT DOCUMENTS

| | | | | |
|---|---|---|---|---|
| 7,296,139 | B1 | 11/2007 | Case et al. | |
| 2005/0050277 | A1* | 3/2005 | Shen | G06F 12/0864 711/E12.018 |
| 2009/0182976 | A1* | 7/2009 | Agesen | G06F 12/1009 711/E12.059 |
| 2012/0297139 | A1* | 11/2012 | Choi | G06F 12/1009 711/E12.024 |
| 2020/0057729 | A1* | 2/2020 | Liu | G06F 12/1009 |
| 2020/0133881 | A1* | 4/2020 | Campbell | G06F 12/1054 |
| 2020/0257465 | A1* | 8/2020 | Hu | G06F 3/0679 |
| 2022/0050792 | A1* | 2/2022 | Campbell | G06F 12/1045 |
| 2022/0075734 | A1* | 3/2022 | Pape | G06F 12/1027 |
| 2022/0114086 | A1 | 4/2022 | Clark et al. | |
| 2022/0382684 | A1* | 12/2022 | Durham | G06F 12/1475 |
| 2023/0401160 | A1* | 12/2023 | Huggahalli | G06F 12/1027 |
| 2024/0354261 | A1* | 10/2024 | Tsirkin | G06F 12/1081 |

FOREIGN PATENT DOCUMENTS

| | | |
|---|---|---|
| KR | 10-1189259 | 10/2012 |
| KR | 10-2273622 | 7/2021 |
| KR | 10-2022-0108808 | 8/2022 |

* cited by examiner

*Primary Examiner* — Tasnima Matin
(74) *Attorney, Agent, or Firm* — F. CHAU & ASSOCIATES, LLC

(57) ABSTRACT

A memory system includes a host and a memory device. The host is configured to translate a virtual address into first physical address based on a first page size and issue a memory access request including the first physical address. The memory device is configured to receive the memory access request from the host, translate the first physical address into a second physical address based on a second page size that is smaller than the first page size in response to the memory request, and access memory cells using the second physical address.

20 Claims, 8 Drawing Sheets

MEMORY DEVICE AND SYSTEM FOR PERFORMING ADDRESS TRANSLATION USING MULTIPLE PAGE SIZES

CROSS-REFERENCE TO RELATED APPLICATIONS

This patent application claims priority under 35 USC § 119(a) to Korean Patent Application No. 10-2023-0176492, filed on Dec. 7, 2023, in the Korean Intellectual Property Office, the entire disclosure of which is incorporated by reference in its entirety herein.

1. Technical Field

The following description relates to a memory device, a method of operating the memory device and a system including the memory device.

2. Discussion of Related Art

Virtual memory is a memory management technique that allocates a memory space for a process to a virtual address space instead of allocating the memory space directly to a physical memory space. The process may read and write data using a virtual address of the virtual address space. However, the virtual address needs to be translated into a physical address of the physical memory space before the data can be accessed. The translation of the virtual address into the physical address happens via a data structure referred to as page table.

In Single-level paging, a single-level page table holds entries for all virtual pages of the virtual address space. However, the single-level page table can become quite large, potentially consuming a significant portion of physical memory, thereby reducing the available space for actual data and programs.

In Multi-level paging, the page table is divided into smaller hierarchical levels, each level pointing to the next to create a multi-level page table that is used for translating the virtual memory address into the physical memory address without consuming a significant portion of physical memory, thereby increasing the available space for actual data and programs. In Multi-level paging, the virtual memory address is translated into the physical memory address by performing a page table walk to traverse the multi-level page table. However, system performance may be reduced since a page table walk may involve multiple memory accesses before reaching the physical address.

SUMMARY

In an embodiment, a memory device includes a memory processing unit configured to receive a memory access request including a first physical memory address based on a first page size from a host, translate the first physical address based on the first page size into a second physical address based on a second page size that is smaller than the first page size, and access memory cells of the memory device using the second physical address.

The first page size may be a huge page size, and the second page size may be a normal page size that is smaller than the huge size.

The first physical address may include a physical frame number (PFN) based on the first page size, and a first page offset based on the first page size.

The memory processing unit may be further configured to generate tag data using a portion of a first page offset of the first physical address and a physical frame number (PFN) of the first physical address, based on the first page size.

The memory processing unit may be configured to generate the tag data further based on a process identifier executed by an operating system in addition to the portion of the first page offset and the PFN.

The memory processing unit may be configured to determine a device PFN (DPFN) using a page table entry (PTE) found in an internal page table of the memory device based on the tag data, and generate the second physical address based on the DPFN.

The memory processing unit may be configured to extract a page offset from the first physical address based on the second page size, and determine the second physical address by combining the page offset and a device physical frame number (DPFN).

The memory processing unit may be configured to, when a miss is detected in at least one of a translation lookaside buffer (TLB), a huge page table entry (PTE), or an internal PTE, set up a new internal PTE corresponding to the second physical address in an internal page table of the memory device.

The memory device may be configured to receive the memory access request from the host via an external bus based on at least one of a compute express link (CXL) protocol or a peripheral component interconnect (PCI) protocol.

The memory device may be configured to reserve a partial area of a memory module for a page cache used by an operating system of the host.

In an embodiment, a method of operating a memory device includes: receiving a memory access request including a first physical address based on a first page size from a host; translating the first physical address into a second physical address based on a second page size that is smaller than the first page size; and accessing memory cells of the memory device using the second physical address.

In an embodiment, a memory system includes a host and a memory device. The host is configured to translate a virtual address into first physical address based on a first page size and issue a memory access request including the first physical address. The memory device is configured to receive the memory access request from the host, translate the first physical address into a second physical address based on a second page size that is smaller than the first page size in response to the memory request and access memory cells using the second physical address.

DETAILED DESCRIPTION

Embodiments will now be described more fully hereinafter with reference to the accompanying drawings. Embodiments may, however, be provided in different forms and should not be construed as limiting. The same reference numbers may indicate the same components throughout the disclosure.

It should be noted that if one component is described as being "connected", "coupled", or "joined" to another component, a third component may be "connected", "coupled", and "joined" between the first and second components, although the first component may be directly connected, coupled, or joined to the second component.

As used herein, the singular forms "a," "an," and "the" are intended to include the plural forms as well, unless the context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof.

Figure 1:
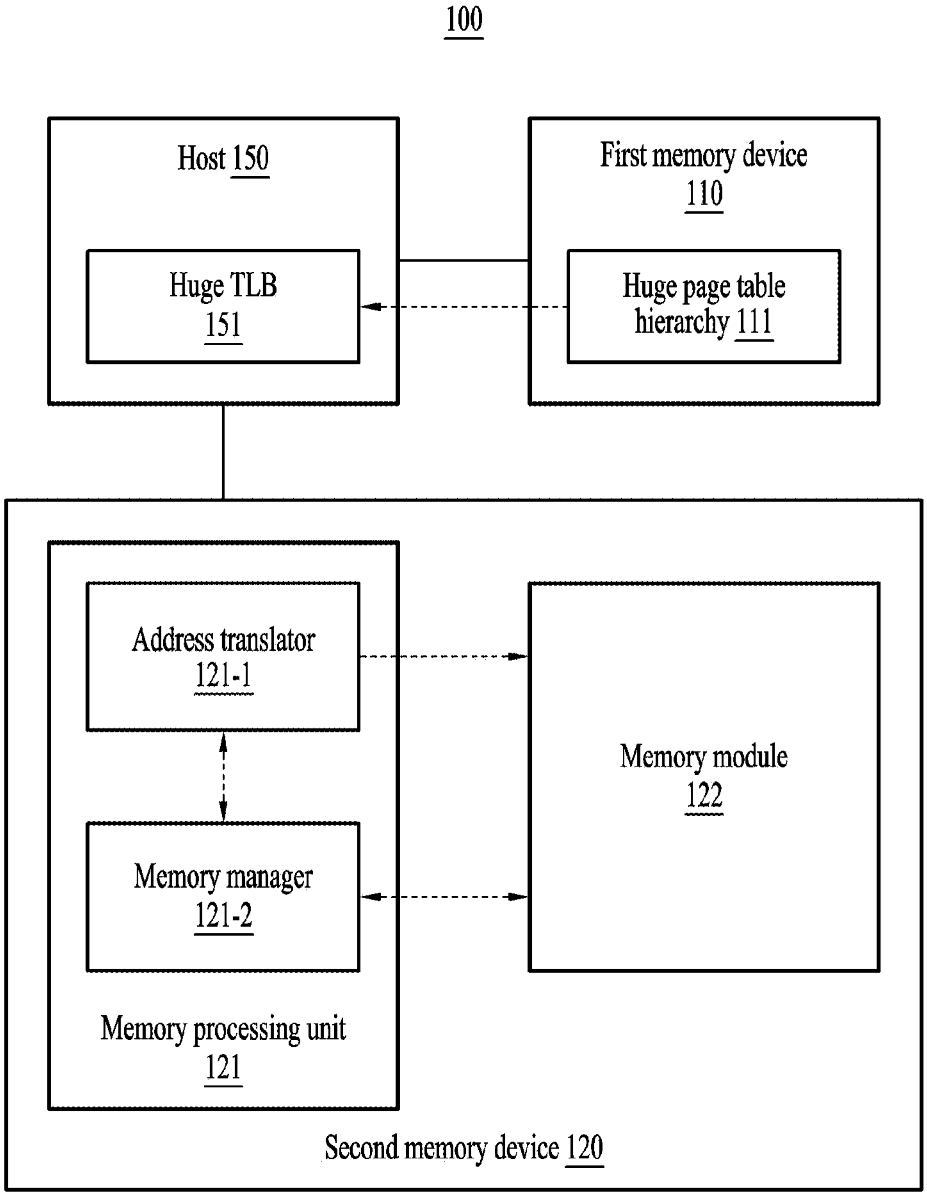
FIG. 1 illustrates a memory system according to an embodiment.

FIG. 1 illustrates a memory system according to an embodiment.

According to an embodiment, a memory system 100 may include a host 150 (e.g., a host device) and memory devices 110 and 120. In FIG. 1, as an example of the memory devices 110 and 120, the first memory device 110 and the second memory device 120 are illustrated. The first memory device 110 may be a memory device closest to the host 150 in a memory layer and may communicate with the host 150 via a memory bus. The second memory device 120 may be a memory device adjacent to the host 150 and may communicate with the host 150 via an external bus. For example, the external bus may be a data bus based on at least one of a compute express link (CXL) protocol or a peripheral component interconnect (PCI) protocol.

The host 150 may be a main management entity of a computer system (e.g., an electronic device) and may be implemented as a host processor or a server. The host processor may include, for example, a host central processing unit (CPU). For example, the host processor may include a processor core and a memory controller. The memory controller may control the peripheral memory devices 110 and 120. The memory controller may transmit an instruction (e.g., a memory access request) to the memory devices 110 and 120. In addition, the host processor may process data received from the memory devices 110 and 120 using a processor core.

The host 150 in an embodiment issue a memory access request including a first physical address based on a first page size translated from a virtual address. The first page size may be a huge page size and may be, for example, 2 megabytes (MB). A page of the huge page size may be referred to as a huge page. A normal page has a normal page size less than the huge page size. For example, the normal page size may be 2048 bytes, 4096, 8192 bytes, but is not limited thereto. The host 150 may translate a virtual address into a first physical address based on at least one of a translation lookaside buffer (TLB) or a page table walk (PTW). A TLB that uses at least one page of a huge size may be referred to as a huge TLB. A PTW that operates on at least one page of a huge size may be referred to as a huge PTW.

For example, the host 150 may include the huge TLB 151. The huge TLB 151 may be a cache (e.g., an address translation cache) to translate a virtual address (e.g., a virtual memory address) into a physical address (e.g., a physical memory address recognized by the host 150). The huge TLB 151 may store a translation table that maps the virtual address to the physical address. The huge TLB 151 may store a mapping relationship between the virtual address and the physical address for an address in which a memory access request has occurred during a determined period (e.g., a recent period of a predetermined time length based on a current operation time of the host 150). When attempting to access the second memory device 120, the host 150 may search for a virtual address requested by the huge TLB 151. During the search, a TLB hit or TLB miss may occur. The TLB hit may indicate that a virtual address requested by the host 150 (e.g., an operating system of the host 150) has been found in the huge TLB 151 and a TLB miss may indicate that a virtual address requested by the operating system could not be found in the huge TLB 151. In the case of a huge TLB hit, the host 150 may determine a physical address (e.g., the first physical address) that is mapped to the virtual address in the huge TLB 151.

Figure 5:
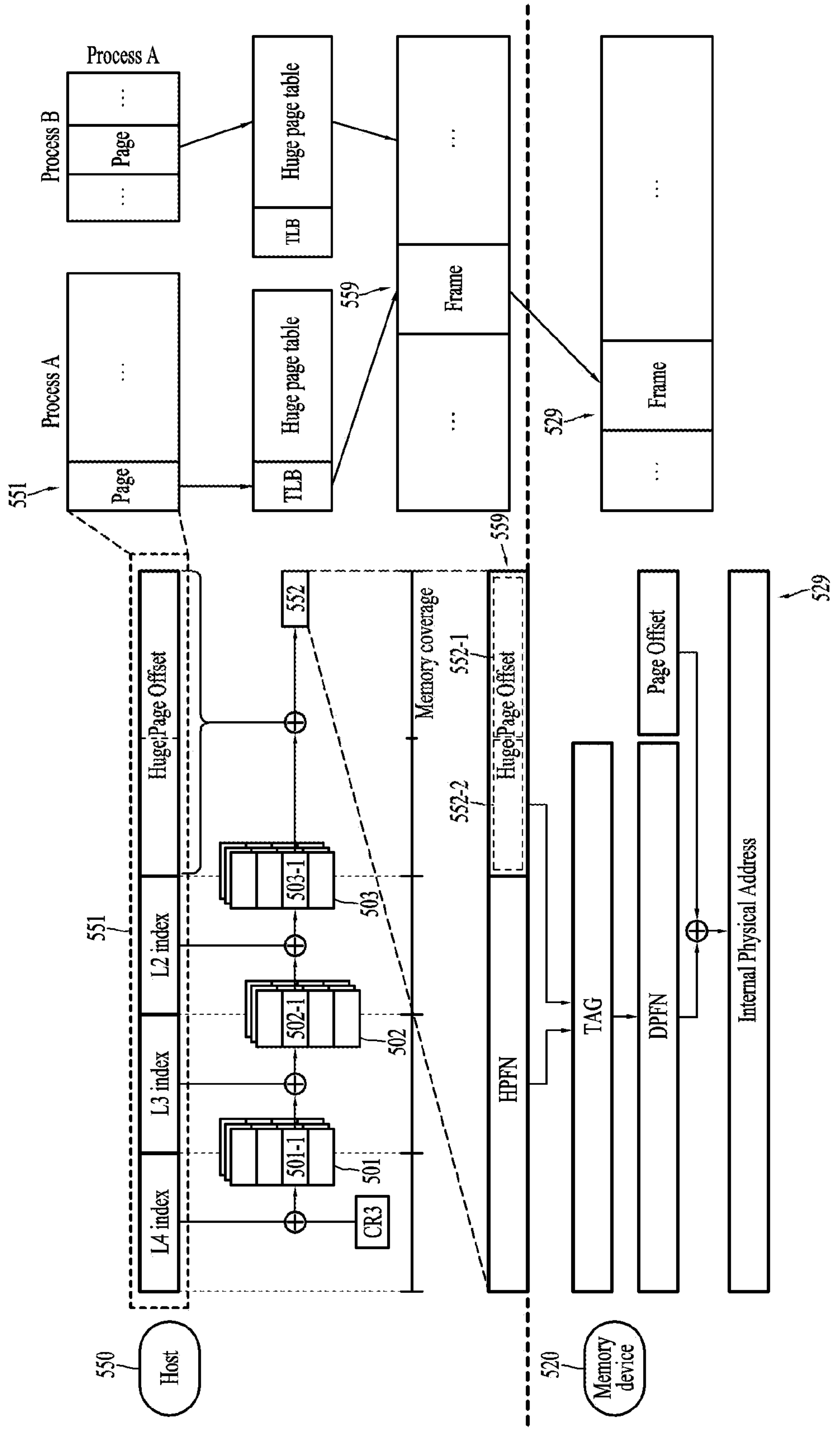
FIG. 5 illustrates a page table walk operation, a virtual address, a first physical address, and a second physical address of a memory system according to an embodiment.

After a huge TLB miss, the host 150 may perform a huge PTW operation on a huge page table hierarchy 111. Herein, the virtual address and the physical address are addresses based on multi-level paging, and translation from a virtual address into a physical address (e.g., the first physical address) based on a huge PTW operation is described with reference to FIG. 5 shown below.

The host 150 may request the second memory device 120 for a memory access using the first physical address determined based on at least one of the huge TLB 151 described above or the huge PTW.

The memory devices 110 and 120 in an embodiment process data in a memory area described below by cooperating with the host processor. For example, the memory devices 110 and 120 may process data based on an instruction received from the host processor. The memory device 110 may control a memory area in response to the instruction of the host processor. The memory device 110 may be separate from the host processor. The peripheral memory device 110 may be, for example, a memory device connected to and disposed adjacent to the host 150. Herein, an operation of the second memory device 120 among the memory devices is mainly described. For example, the second memory device 120 may include a memory processing unit 121 (e.g., a processor) and a memory module 122 (e.g., a memory device).

The memory module 122 may store data. The memory module 122 may include a plurality of memory blocks forming a memory area. The memory area may be an area that is able to store data therein and may represent an area (e.g., a physical area) in which reading and/or writing data is enabled in a memory chip of a physical memory device (e.g., the second memory device 120). The memory area may be disposed in a memory die (or a core die) of the second memory device 120. The plurality of memory blocks may be generated by using a portion or all of the memory chips of the second device 120. Each memory block may correspond to a memory bank, and the plurality of memory blocks may be grouped by memory rank and/or memory channel. For example, a memory rank may be a set of simultaneously accessible memory chips (e.g., dynamic random-access memory (DRAM) chips) connected to the same chip select. A memory channel may be a set of memory chips accessible via the same channel (e.g., memory channel).

According to an embodiment, the second memory device 120 (e.g., the memory processing unit 121) translate the first physical address based on a first page size corresponding to a memory access request received from the host 150 into the second physical address based on a second page size that is smaller than the first page size. An address translator 121-1 may translate the first physical address into the second physical address based on an internal page table. The address translator 121-1 may be implemented by a logic circuit, but is not limited thereto. The internal page table may be a table internally managed in the second memory device 120 and may store a mapping relationship between the first physical address and the second physical address. The mapping relationship between the first physical address and the second physical address may be, for example, expressed as mapping between tag data calculated based on the first physical address and a device physical frame number including a portion of the second physical address. The memory processing unit 121 may access a corresponding memory location of the memory module 122 based on the second physical address. The first physical address may be a physical address from the perspective of the host 150 and may be a virtual address from the perspective of the memory device 120. The second physical address may be a physical address in the second memory device 120. For reference, although mainly referred to as a virtual address in the present disclosure, the virtual address may be referred to as a logical address.

In an embodiment, the second page size is a normal page size and may be, for example, 4 kilobytes (KB). As described above, the memory system 100 may operate using the first page size (e.g., 2 MB) in external devices (e.g., the host 150 and the first memory device 110) of the second memory device 120 and in the second memory device 120, the memory system 100 may operate using the second page size (e.g., 4 KB) that is smaller than the first page size. Accordingly, the memory system 100 may support both normal paging and huge paging. Hereinafter, an example in which the first page size is a huge page size and the second page size is a normal page size is mainly described. However, the first page size and the second page size are not limited to the example described above and the huge page size and the normal page size may vary depending on hardware or workload characteristics.

For example, compared to normal paging, the memory system 100 in an embodiment may provide decreased TLB pressure using a huge page table and a TLB entry. The TLB pressure may represent a level of utilization or demand for the TLB and when the TLB pressure decreases, the frequency of the use of TLB may decrease. Compared to huge paging, the memory system 100 in an embodiment may decrease and/or prevent excessive use of a physical memory. When only a portion (e.g., a small portion) of an actually allocated huge page is used, the memory system 100 may use the corresponding portion. Accordingly, an occurrence of memory swap due to unnecessary low memory may decrease and performance degradation may also decrease. While using the huge page table and the TLB entry, the memory system 100 may still operate on the normal page. Data of an application program executed in an arbitrary operating system may be stored in a memory in a predetermined unit. For example, in the LINUX™ operating system, the data of an application program may be stored in a memory device (e.g., the second memory device 120) in the unit of page. As described above, the host 150 may manage a memory and may operate on a huge page. However, the operating system and the second memory device 120 may manage a memory and may operate on a normal page. A memory subsystem of the operating system may operate on a normal page while being able to support a huge page table entry.

For reference, the memory processing unit 121 may be a set (e.g., a logic circuit) of logic elements (or circuits) manufactured and/or implemented to include logic for a designated operation. The memory processing unit 121 may also include an acceleration logic circuit. The second memory device 120 may include, for example, an acceleration dual in-line memory module (AXDIMM), a compute eXpress link-AXDIMM (CXL-AXDIMM), and a CXL-disaggregated memory pool (MDP). The memory processing unit 121 may also be implemented to be integrated into a CXL switch, a memory controller (MC), or an interface unit.

A memory manager 121-2 may control the memory module 122 based on a memory access request including the second physical address. For example, the memory manager 121-2 may transfer an address value requested to be read by the memory processing unit 121 to the memory processing unit 121 or may transfer a value requested to be written for an arbitrary address to the memory module 122.

The operations and/or functions of the memory processing unit 121 may include the address translator 121-1 and the memory manager 121-2. However, the memory processing unit 121 is not limited thereto and some or all of the modules may be integrated.

The memory system 100 in an embodiment may be applied to a near memory accelerator having a memory management function and memory management and related system software. When the memory system 100 implements high-performance computing (e.g., a data center application, a database system, or a recommendation system), the second memory device 120 may be a CXL device. The memory system 100 may efficiently utilize a memory management capability of near memory.

In an embodiment of the memory system 100, since a split of a huge page may not need to be performed by the host 150 (e.g., a host CPU), an additional operation cycle may not occur. The memory system 100 may accelerate the management of the memory module 122 in the second memory device 120. In multi-level paging, address translation may include operations corresponding to a plurality of levels and an operation of a last level of address translation may be offloaded to the second memory device 120. The host 150 and/or the first memory device 110 may use a huge page table and a huge TLB entry for operations (e.g., operations of levels other than the last level) of an upper level of address translation. The internal page table for an operation of the last level of the address translation may be managed in the second memory device 120.

Figure 2:
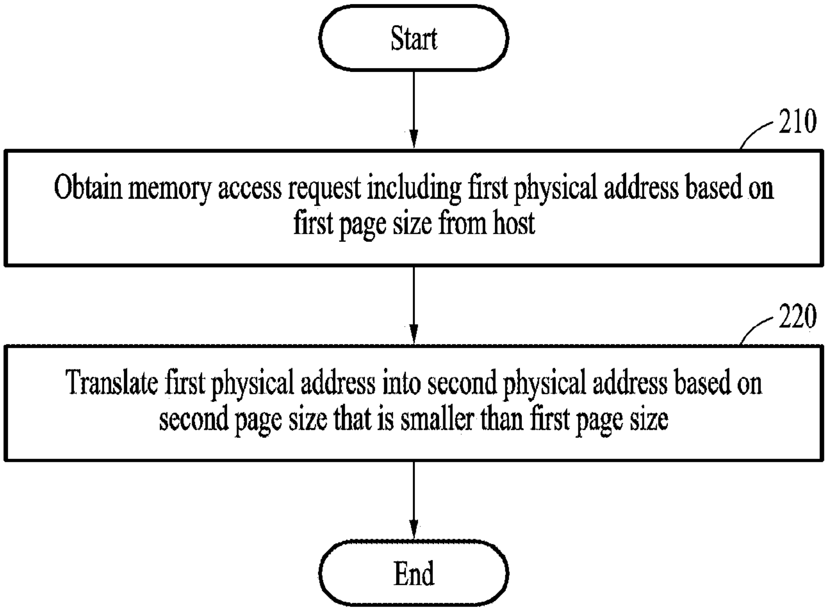
FIG. 2 is a flowchart illustrating an operating method of a memory device according to an embodiment.

FIG. 2 is a flowchart illustrating an operating method of a memory device according to an embodiment.

In operation 210, a memory device (e.g., the second memory device 120 of FIG. 1) obtains a memory access request including a first physical address based on a first page size from a host. The memory device may receive a memory access request from the host through an external bus based on at least one of a CXL protocol or a PCI protocol. The memory device may receive a memory access request including the first physical address based on a huge page size. In an embodiment, the first physical address includes a physical frame number (PFN) based on the first page size and a first page offset based on the first page size. For example, the memory device may receive a memory access request including the PFN based on the first page size and the first page offset based on the first page size. The PFN based on the first page size may be a PFN from the perspective of the host and may be referred to as a host PFN (HPFN).

In operation 220, the memory device translates the first physical address into a second physical address based on a second page size that is smaller than the first page size. The memory device may translate the first physical address into the second physical address based on a normal page size. The memory device may generate tag data using a portion of a first page offset based on the first page size and the PFN based on the first page size. The memory device may determine a device PFN (DPFN) using a page table entry (PTE), wherein the DPFN is searched in the internal page table of the memory device based on the tag data. The memory device may extract a second page offset from the first physical address based on the second page size. In an embodiment, the first page offset is a huge page offset (e.g., an offset to a huge page) and the second page offset is a normal page offset (e.g., an offset to a normal page). The memory device may determine the second physical address by combining the second page offset with the DPFN. The structures of the virtual address, the first physical address, and the second address and a translation operation are described with reference to FIG. 5 shown below.

The memory device in one embodiment may access a memory location indicated by the translated second physical address. The memory device may perform a read operation and/or a write operation at the accessed memory location.

Figure 3:
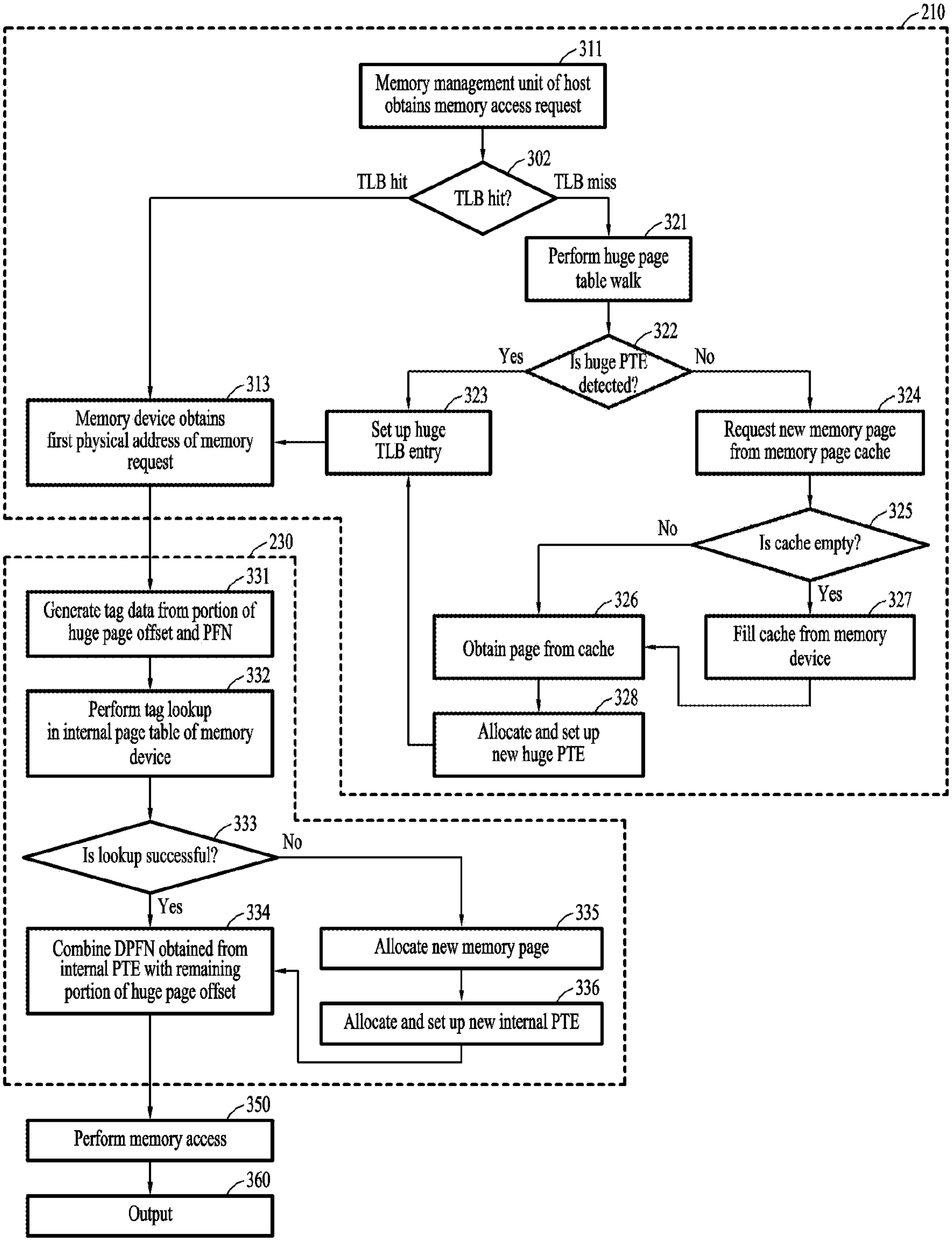
FIG. 3 is a flowchart illustrating a detailed operation of a memory system according to an embodiment.

FIG. 3 is a flowchart illustrating a detailed operation of a memory system according to an embodiment.

In operation 210, a host (e.g., the host 150 of FIG. 1) may perform operations of levels other than a last level among operations for address translation. For example, if three levels of page address translation are needed, then the host would only perform the first two levels of page address translation. In operation 230, a memory device (e.g., the second memory device 120 of FIG. 1) performs an operation of the last level among the operations for page address translation. Accordingly, an operation of the last level among page address translation that translates a virtual address into a physical address may be offloaded to a memory (e.g., the second memory device) adjacent to the host. Software and/or an operating system may manage the second memory device by using a normal page. On the other hand, in a page table (e.g., a huge page table), a huge PTE may be set up with respect to the second memory device.

For example, in operation 311, a memory management unit (MMU) of the host obtains a memory access request. The MMU may obtain a memory access request requested by the operating system of the host. The memory access request may have a virtual address.

In operation 302, the host determines whether a TLB hit occurs. For example, the host may search for an entry corresponding to the virtual address of the memory access request in huge TLB entries stored in a huge TLB (e.g., 151). When the huge TLB entry corresponding to the virtual address is found, the host may determine that a TLB hit occurs. When the TLB entry corresponding to the virtual address is not found, the host may determine that a TLB miss occurs.

In operation 321, in the case of TLB miss, the host performs a huge page table walk. According to an embodiment, the MMU of the host and a page walker may respectively recognize that they operate on a huge page. As described below, other portions (e.g., software and the second memory device) of the memory system may recognize that they operate on a normal page. For reference, the operating system of the host may operate on a normal page. However, the host and the first memory device may process a memory access request requested by the operating system. A PTW operation by the page walker is described with reference to FIG. 5 shown below.

In operation 322, the host may determine whether a huge PTE is detected. When the huge PTE is detected, the host sets up a huge TLB entry in operation 323. For example, the host may add, to a huge TLB, a huge TLB entry representing a mapping (or a mapping relationship) between the virtual address and the first physical address based on the detected huge PTE.

Figure 8:
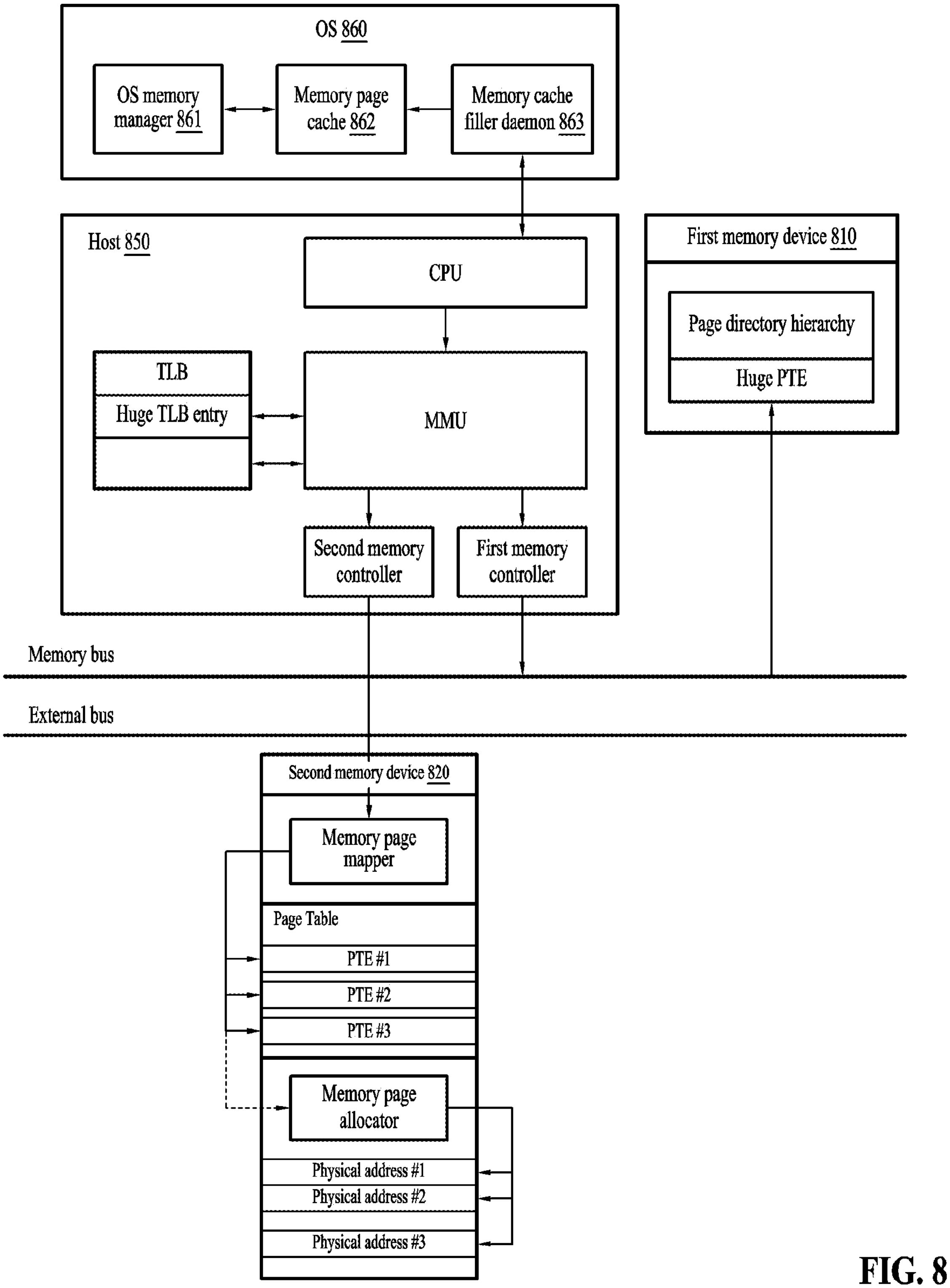
FIG. 8 illustrates an example of a memory system including a memory page cache according to an embodiment.

In operation 324, the host requests a new memory page from a memory page cache when the huge PTE is not detected. The memory page cache may be a cache including information indicating a reserved and/or allocated area for paging in the memory device and may be implemented as software. In operation 325, the host determines whether the memory page cache is empty. In operation 327, when the memory page cache is determined to be empty, the host may perform a populate operation on the cache from the memory device. The populate operation may fill the cache. In operation 326, the host obtains a page from the memory page cache. In operation 328, the host allocates and set up a new huge PTE using the page obtained from the memory page cache. For example, the host may add, to the huge page table, a huge PTE representing a mapping relationship between a virtual address and a physical address (e.g., the first physical address from the perspective of the host) indicating a page selected from pre-allocated pages in the memory page cache. For reference, operations 324 to 326 described above may represent operations performed in an embodiment using a page cache (e.g., the second memory page cache) in which the host is implemented as software in FIG. 8 shown below. When the host does not use a page cache and the huge PTE is not detected in operation 322, the host may allocate and set up a new huge PTE according to operation 328.

In addition, operations 321 to 328 described above may be operations in the case of TLB miss, and may be related to the setup of the huge TLB entry. As described below, in the case of TLB hit, a PTW operation and an insertion operation of a huge TLB entry according to operations 321 to 328 may be omitted.

In operation 313, the memory device obtains the first physical address of a memory request. In the case of TLB hit, the host may directly transmit the first physical address corresponding to the memory request found in the TLB (e.g., 151) to the memory device (e.g., the second memory device). In the case of TLB miss, the host may determine the first physical address corresponding to the virtual address through operations 321 to 328 described above. The host may transmit the determined first physical address to the memory device (e.g., 120). The memory device may receive a memory access request having the first physical address through an external bus.

In operation 331, the memory device generates tag data from a portion of a huge page offset and the PFN. The PFN may be a PFN of the first physical address from the perspective of the host and may also be referred to as an HPFN. The generation of tag data is described with reference to FIG. 5.

In operation 332, the memory device performs a tag lookup in an internal page table of the memory device. The internal page table may represent a table storing a mapping relationship between the first physical address (e.g., the physical address from the perspective of the host) and the second physical address (e.g., an internal physical address from the perspective of the memory). An entry (e.g., an internal PTE) of the internal page table may include information representing a mapping between a DPFN (e.g., a PFN from the perspective of the memory) and the tag data (e.g., a tag value) determined based on a portion of the first physical address. The memory device may search the internal page table for an internal PTE that matches the tag data generated in operation 331.

In operation 333, the memory device determines whether a lookup is successful. The lookup may be a search of the internal page table for the matching PTE. When the lookup fails (e.g., no matching internal PTE is found), in operation 335, the memory device allocates a new memory page. In operation 336, the memory device allocates and set up a new internal PTE. For example, the memory device may add, to the internal page table, an internal PTE including information representing a mapping between the tag data and the DPFN.

In operation 334, when the lookup is successful (e.g., a matching internal PTE is found), the memory device determines the internal physical address (e.g., the second physical address) by combining the DPFN obtained from the internal PTE with the remainder (e.g., a normal page offset) of the huge page offset.

In operation 350, the memory device performs a memory access based on the determined second physical address. In operation 360, the memory device outputs a result of the memory access. For example, the memory device may read a value of a memory location indicated by the second physical address or may write a value in a corresponding memory location.

The memory system in an embodiment may decrease TLB pressure for a memory-intensive workload, PTW overhead of a central processing unit (CPU), and cache miss (e.g., huge TLB miss or huge PTE miss). Since address translation of the last level is performed by the second memory device, the footprint and traffic of the first memory device may decrease.

Figure 4:
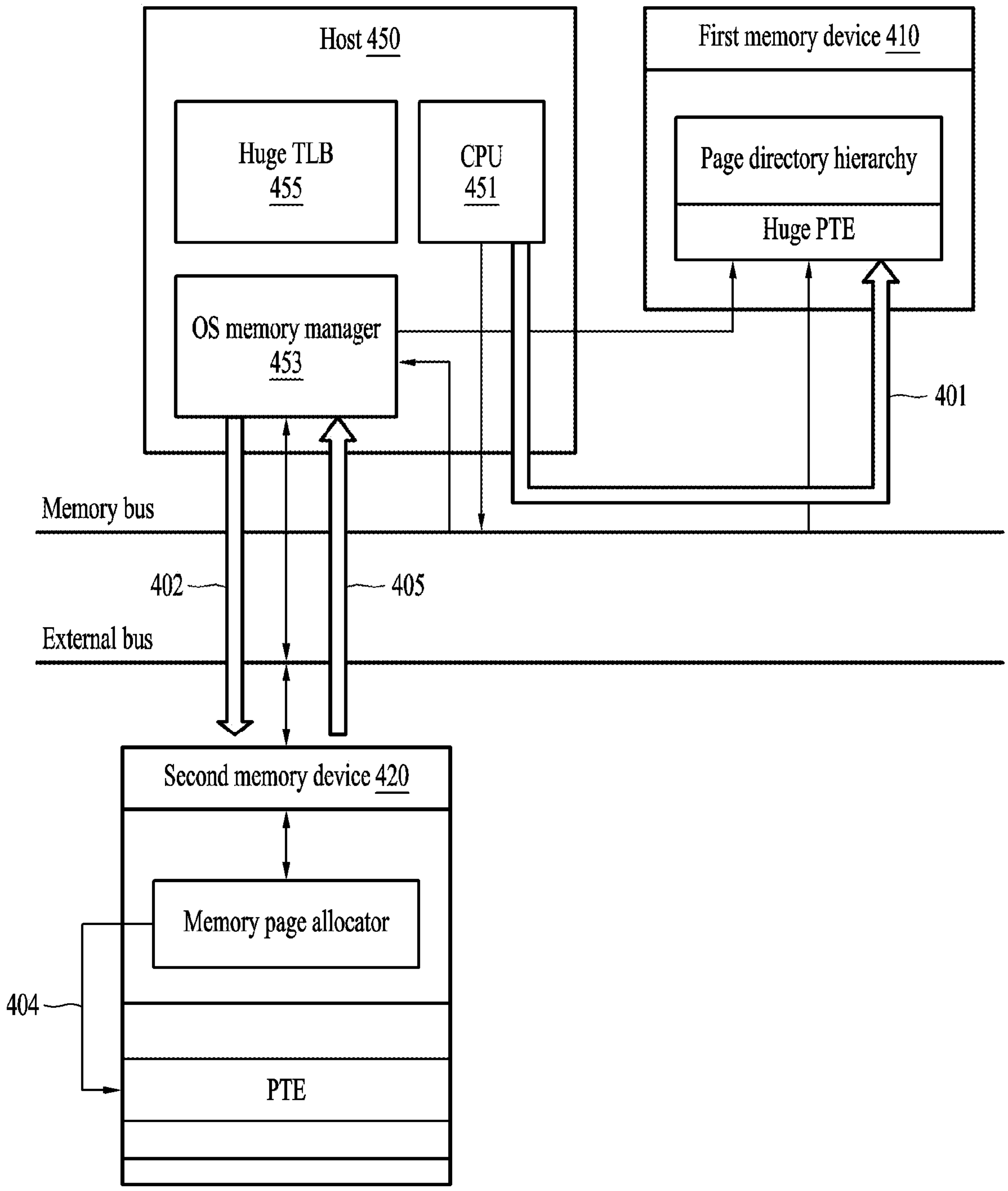
FIG. 4 illustrates a setup operation of a translation lookaside buffer (TLB), a huge page table entry (PTE), and an internal PTE according to an embodiment.

FIG. 4 illustrates a setup operation of a translation lookaside buffer (TLB), a huge page table entry (PTE), and an internal PTE according to an embodiment.

When a miss is detected in at least one of a TLB, a huge PTE, or an internal PTE, a memory system (e.g., the memory system 100 of FIG. 1) in an embodiment sets up or creates a new internal PTE corresponding to a second physical address in an internal page table of the memory device. The memory system may add an entry representing a mapping relationship between a virtual address and a first physical address to a huge TLB 455 and a huge page table (e.g., a page directory hierarchy). The memory system may add an entry (e.g., an internal PTE) representing a mapping relationship between the first physical address and the second physical address to an internal page table. For example, the internal PTE may include mapping information between tag data corresponding to a PFN of a host 450 (HPFN) based on the first physical address and a DPFN corresponding to the second physical address. For reference, FIG. 4 illustrates an example of a TLB miss when a miss has occurred in a huge PTE or an internal PTE.

In an embodiment, an operating system (e.g., LINUX™) of the host 450 has its own memory subsystem. The memory subsystem may be an operating system (OS) memory manager 453 implemented in the host 450. The OS memory manager 453 may use physical memory allocation and virtual memory-to-physical memory mapping on allocated pages. A first memory device 410 (e.g., DRAM) may be connected to the host 450 (e.g., a host CPU 451) via a memory bus (e.g., a double data rate (DDR) interface). A second memory device 420 may be connected to the host 450 via an external bus (e.g., an interface based on a CXL protocol). The second memory device 420 may provide a memory area of a memory module (e.g., the memory module 122 of FIG. 1) to the host 450. The second memory device 420 may have a relatively large capacity.

In operation 401, the CPU 451 of the host 450 may perform a PTW operation on the first memory device 410. The host 450 may search for a huge PTE with respect to a given virtual address.

In operation 402, when the host 450 fails to find a huge PTE with respect to the given virtual address during the PTW operation, the host 450 may request a memory page from the second memory device 420. The software (e.g., a kernel memory manager or an OS memory manager) of the host 450 may request the memory page from the second memory device 420 via an external bus.

In operation 404, the second memory device 420 may allocate a new normal physical page. For example, the second memory device 420 may allocate a page in a partial area of a memory module using a memory page allocator. The memory page allocator may be a hardware module configured to track a state (e.g., allocation and/or free) of the memory and handle memory allocation and/or a memory free based on the page request from both the host 450 and the memory, and for example, may be integrated into a memory processing unit. However, embodiments are not limited thereto and the memory page allocator may be implemented as a separate hardware module.

The second memory device 420 may allocate a page of a second page size (e.g., a normal page size). The second memory device 420 may set up an internal PTE corresponding to the newly allocated page having the second page size. For example, the second memory device 420 may add, to an internal page table, an internal PTE including mapping between tag data and a DPFN corresponding to an internal physical address of the newly allocated page. The tag data may have a tag value calculated by using a portion of the huge page offset and the host 450 PFN of the first physical address as described above.

In operation 405, the software (e.g., the operating system) of the host 450 may set up the huge PTE in the huge page table and the TLB. For example, the host 450 may add a new huge PTE representing a requested virtual address and the first physical address to the huge page table and the TLB. For reference, memory access thereafter is described with reference to FIG. 6.

FIG. 5 illustrates a page table walk operation, a virtual address, a first physical address, and a second physical address of a memory system according to an embodiment.

FIG. 5 illustrates an example of a virtual address based on multi-level paging and a PTW for the virtual address. Referring to FIG. 5, a virtual address 551 may be translated into a physical address 552 through a PTW based on multi-level paging. FIG. 5 illustrates an example of using a hierarchical structure having four levels, but examples are not limited thereto. For example, a hierarchical structure having more than five levels may be used.

Each operation of a process may be performed in the unit of pages. The number of pages may be determined based on page size and the number of representable bits supported by the processor. For example, when the number of representable bits of the virtual address 551 is 48-bits, a virtual memory space of 256 terabytes (TB) that is 2^48 may be represented through the virtual address 551. When the page size is 4 KB, 64 billion pages that is 256 TB/4 KB may be obtained. Since a page table supports as many indexes as the number of pages, 64 billion indexes may be included and the virtual address 551 may occupy an address space in a range of 0×00000000_00000000 to 0×0000ffff_ffffffff.

As described above, when using the virtual address 551 without a hierarchical structure, too much address space may be required. Accordingly, the virtual address 551 may be managed using multi-level paging based on a page table having multiple levels. When using multi-level paging, page table walk may be performed for each level of the hierarchical structure.

Referring to FIG. 5, upper bits excluding a huge page offset of the virtual address 551 may be respectively assigned to levels of the hierarchical structure. For example, the number of representable bits of the virtual address 551 may be 48-bits and 9-bits may be allocated to each of L2 to L4 indexes. For example, the L4 index may be page map level (PML) 4, and may be allocated from a $47^{th}$ bit location to a $39^{th}$ bit location from a least significant bit (LSB). The L3 index may be a page directory pointer table (PDPT) and may be allocated from a 38th bit location to a 30th bit location from the LSB. The L2 index may be a page directory (PD) and may be allocated from a 29th bit location to a 21st bit location from the LSB. The huge page offset may be a bit sequence represented by 21 bits and may be allocated from a 20th bit location to a 0th bit location from the LSB. The bit sequence of the 11th bit location to the 0th bit location of the huge page offset may be a normal page offset 552-1. In the huge page offset, a remaining portion 552-2 other than the normal page offset 552-1 may have bit values corresponding from 20th to 12th bit locations and may be used to generate tag data.

A virtual page number may be specified based on a 3-level PTW of L4 to L2 indexes in the four-level hierarchy structure. A huge PTE in the huge page table may be specified based on the virtual page number using the remaining 20-bit page offset of the virtual address 551.

When an entry of a data set (e.g., a table) of an arbitrary level is specified based on an index of the level, the entry may be used as a pointer indicating a data set of the following level. For example, a first data set 501 may be constructed based on an L4 index of a first level, and each entry of the first data set 501 may be used as a pointer indicating a second data set 502 of a second level.

A first base address of the first data set 501 may be stored in a CR3 register. A sum of the first base address and the L4 index may specify a first entry 501-1. The first entry 501-1 may specify a second base address of the second data set 502. A sum of the second base address and the L3 index may specify a second entry 502-1. Using the method as described above, a third entry 503-1 of a third data set 503 may be specified based on the L3 index and the L2 index. The third data set 503 may correspond to a page directory table. The third entry 503-1 may correspond to a page directory entry (PDE). A physical address 552 (e.g., a first physical address 559) from the perspective of a host 550 may be determined using the third entry 503-1 and the huge page offset. When using multi-level paging, in a PTW operation, an access to memory (or a device in which a page table is stored) in each operation may be required.

With respect to the given virtual address 551, the first physical address 559 determined based on the PTW operation described above may be stored in the TLB and/or the huge page table. For example, the host 550 and/or the first memory device may store a mapping relationship between the virtual address 551 and the first physical address 559 in the TLB and/or the huge page table. The first physical address 559 may be used to calculate an internal physical address (e.g., the second physical address 529) of the second memory device. For reference, as described with reference to FIG. 3, the host 550 may omit the PTW operation depending on the TLB hit or the huge PTE hit, and may obtain the first physical address 559 from the virtual address 551 using the TLB or the huge page table. The first physical address 559 may include the HPFN and the huge page offset. The huge page offset may include the portion 552-1 corresponding to the page offset (e.g., a normal page offset) and the remaining portion 552-2.

A memory device 520 (e.g., the second memory device) may generate tag data TAG based on the portion 552-2 of the huge page offset and the HPFN. For example, the memory device 520 may generate a tag value of the tag data TAG by combining the portion 552-2 of the huge page offset with the HPFN. However, the generation of the tag data TAG is not limited to the example described above and the tag data may be generated by other methods depending on the design.

The memory device 520 may determine a DPFN based on the tag data TAG. As described below, the memory device 520 may search the internal page table for an entry (e.g., an internal PTE) that matches the tag value of the tag data TAG. The memory device 520 may obtain the DPFN indicated by the matched internal PTE.

The memory device 520 may determine an internal physical address (e.g., the second physical address 529) based on the obtained DPFN and the page offset (e.g., a normal page offset that is the portion 552-1 of the huge page offset). For example, the memory device 520 may determine the second physical address 529 by combining the DPFN with the page offset. However, the determination of the second physical address 529 is not limited to the example described above and the second physical address 529 may be determined using other methods depending on the design.

Figure 6:
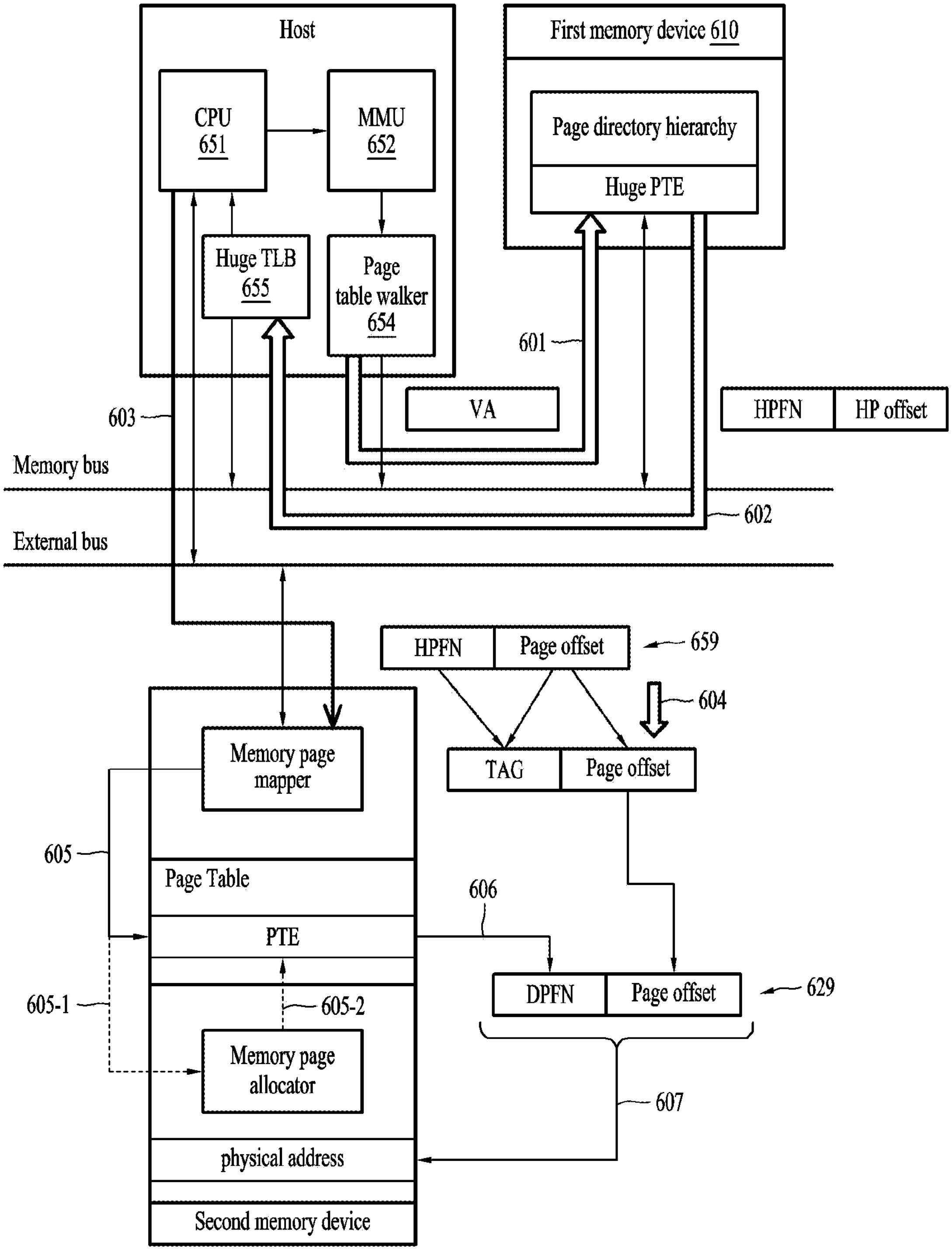
FIG. 6 illustrates an operation of translating a first physical address into a second physical address in a memory system according to an embodiment.

FIG. 6 illustrates an operation of translating a first physical address into a second physical address in a memory system according to an embodiment.

In operation 601, an MMU 652 of a host may launch or perform a PTW on a virtual address VA. The PTW may be performed using a path to a huge page (or a gigantic page). The host may perform PTW on a page directory hierarchy of a first memory device 610 (e.g., a main memory device). FIG. 4 illustrates an example of a TLB miss and huge PTE hit, and PTW 654 may find a huge PTE with respect to the virtual address VA.

In operation 602, a host (e.g., a host CPU 651) may generate a first physical address 659 by combining an HPFN with a huge page offset (or an HP offset). The huge page offset may be extracted from a partial bit range (e.g., a lower bit range) of the virtual address VA. For example, a bit range from an LSB of the virtual address VA to the 0th bit location to the 20th bit locations may be the huge page offset. As described above, in the case of TLB miss, the host may insert new huge page translation data (e.g., a huge TLB entry) into a huge TLB 655. The huge TLB entry may include mapping information that maps the virtual address VA to the first physical address 659.

In operation 603, the host may perform a memory access. The host may issue a normal memory access request (e.g., a read request and a write request) using a memory controller (e.g., PCI-e and CXL) for an external bus.

In operation 604, the second memory device may generate tag data for the address translation of the last level. The second memory device may receive a memory access request having the first physical address 659 from the host. The second memory device may split the huge page offset into a portion corresponding to the normal page offset and the other portion (e.g., a remaining portion). The second memory device may generate tag data TAG by combining a portion of the huge page offset with the HPFN. As described below, the second memory device may generate the tag data by combining a process identifier (PID) in addition to the portion of the huge page offset and the HPFN.

In operation 605, the second memory device (e.g., a memory page mapper) may search an internal page table for a DPFN using the generated tag data. A memory page mapper may search an internal page table for an internal PTE that matches the tag data. The memory page mapper may determine the DPFN indicated by the found internal PTE.

For reference, in the case of internal PTE miss, a memory page allocator may allocate a memory frame in operations 605-1 and 605-2. For example, when an internal PTE that matches the tag data does not exist in the internal page table, the memory page allocator may allocate a requested memory frame. The memory page allocator may set up (e.g., add to the internal page table) a new internal PTE corresponding to the allocated memory frame.

Although the description assumes the memory page mapper and the memory page allocator are separate modules or circuits for ease of description, the example is not limited thereto. For example, the memory page mapper and the memory page allocator may be integrated into a memory processing unit (e.g., the memory processing unit 121 of FIG. 1).

In operation 606, the second memory device may generate a second physical address 629 based on the determined DPFN and the page offset. For example, the second memory device may generate the second physical address 629 (e.g., a final physical address as the memory internal physical address) by combining the normal page offset with the DPFN indicated by the internal PTE that matches the tag data in the internal page table. The memory processing unit 121 may access memory cells of the memory module 122 using the second physical address 629.

In operation 607, the second memory device may serve a memory request using the generated internal physical address.

Figure 7:
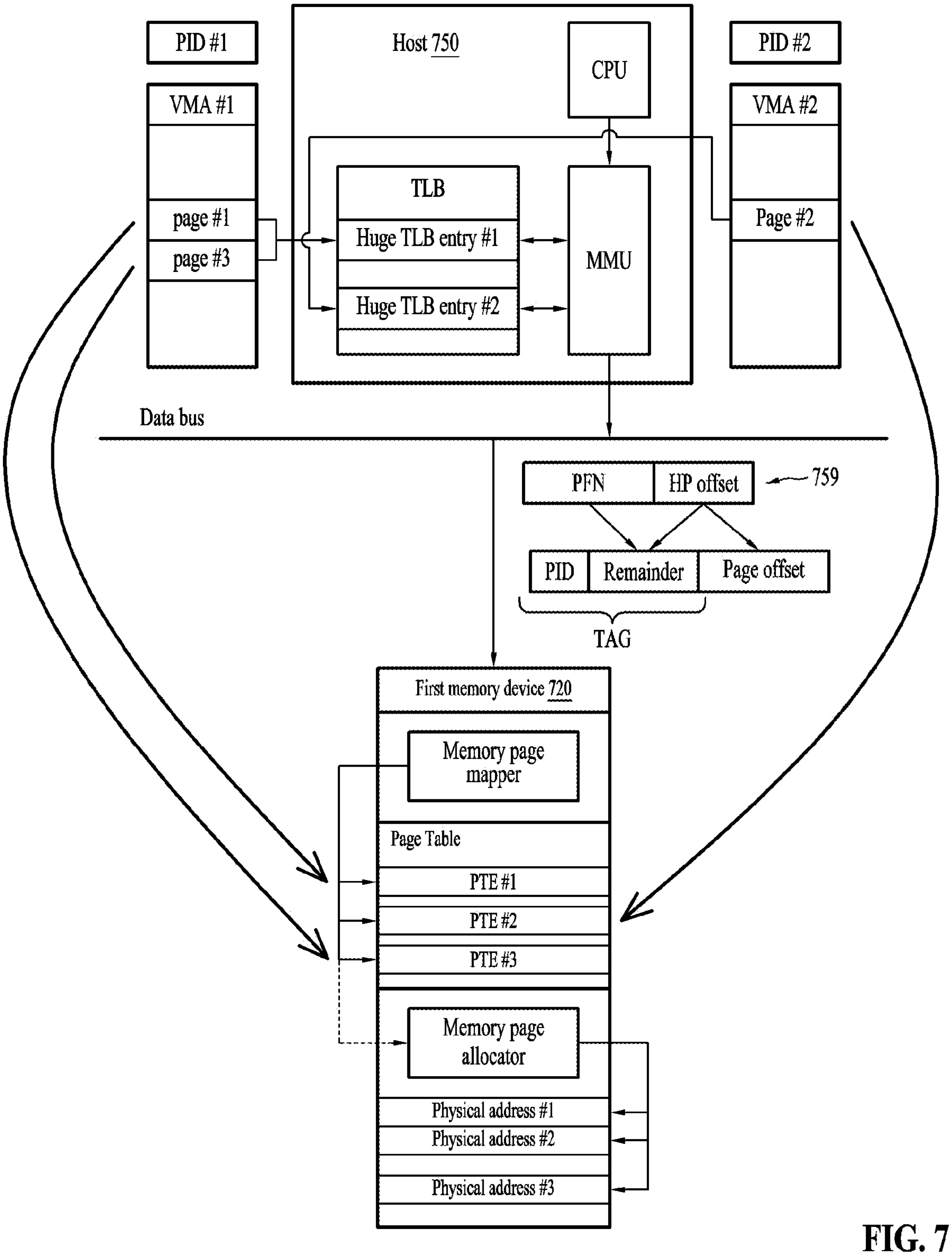
FIG. 7 illustrates an operation of translating a first physical address into a second physical address using tag data based on a physical frame number, a huge page offset, and a process identifier in a memory system according to an embodiment.

FIG. 7 illustrates an operation of translating a first physical address into a second physical address using tag data based on a physical frame number (PFN), a huge page offset, and a process identifier (PID) in a memory system according to an embodiment.

A memory device (e.g., the second memory device 120 of FIG. 1) in an embodiment generates tag data based on a PID executed by an operating system in addition to a portion of a first page offset and a PFN. For example, the normal memory access described with reference to FIG. 6 may be supplemented by a PID. The PID may be a unique ID of each OS process. The PID may be used to distinguish an attempt of different processes to access the same memory page.

For example, when a virtual address space is managed process-wise, a conflict may occur in HPFNs determined only based on a virtual address. The following describes an example of the conflict.

A first process (Process #1) may access a first page (page #1) in a virtual memory area (VMA) (e.g., a first VMA (VMA #1)). A host 750 may detect a TLB miss and a huge PTE miss with respect to the access of the first process (Process #1). An OS memory manager may allocate a first normal physical page (normal physical page #1) and may set up a first entry (Huge TLB entry #1) of a huge TLB. A memory device 720 may perform address translation of a last level in response to a memory request received from the host 750, and may set up a first internal PTE (PTE #1) in an internal page table. Similarly, a second process (Process #2) may access a second page (page #2) in a second VMA (VMA #2). Similarly, the host 750 may detect a TLB miss and a PTE miss with respect to the access of the second process (Process #2). The OS memory manager may allocate a second normal physical memory (e.g., a normal physical page #2). In this case, the second normal physical memory may occur adjacent to the first normal physical memory. The host 750 may set up a second entry (Huge TLB entry #2) of the huge TLB. The memory device 720 may perform an address translation of the last level in response to a memory request received from the host 750 and may set up a second internal PTE (PTE #2) in the internal page table.

The first process (Process #1) may access a third page (page #3) in the first VMA (VMA #1). In this case, the third page (page #3) may be adjacent to the first page (page #1) in the first VMA (VMA #1). Accordingly, the host 750 (e.g., a host CPU) may detect a TLB hit. Since a huge TLB entry is used, adjacent pages (e.g., the first page (page #1) and the third page (page #3)) may be included in the same first huge TLB entry (Huge TLB entry #1). The memory access request may be forwarded directly to the memory device 720. However, without distinction using the PID, the same huge page offset may appear with respect to the second page (page #2) and the third page (page #3). In this case, the memory device 720 may find a valid internal PTE mapping the second physical page (physical page #2) to the third page (page #3) and may perform a memory access. As described above, since the second physical page (physical page #2) is already included in the second process, a conflict may occur. To prevent the conflict described above, the memory device 720 may further consider the PID when generating tag data from the first physical address 759. The memory device 720 may receive a memory access request further including the PID from the host 750.

For example, the memory device 720 may generate tag data based on (e.g., by combining) the PID, the HPFN, and a portion (e.g., a portion (a remainder) corresponding to an upper bit range) of the huge page offset. The upper bit range in the huge page offset may be a range from the 12th bit location to the 20th bit location from the LSB. The memory device 720 may generate different tag data (e.g., a tag value) for different processes (e.g., PID #1 and PID #2) through the PID.

According to an embodiment, in a system where multi-processors and/or multi-cores exist, an attempt to allocate and/or use the same memory page by different processes may be prevented.

FIG. 8 illustrates an example of a memory system including a memory page cache according to an embodiment.

An operating system 860 (e.g., a LINUX™ kernel operating system) may include an OS memory manager 861 as well as a memory allocator (e.g., a memory page cache 862 and a memory cache filler daemon 863). Memory allocation may be accelerated by the memory page cache 862. The memory page cache 862 and the memory cache filler daemon 863 may be implemented as software. To cooperate with the memory page cache 862, the second memory device 820 may reserve a partial area of a memory module for a page cache used by the operating system 860 of a host 850.

The OS memory manager 861 may request memory pages of the second memory device 820 to allocate a memory (e.g., the second memory) of the second memory device 820. However, the communication between the host 850 (e.g., a host CPU based on an x86_64 CPU architecture) via an external bus (e.g., a data bus based on a CXL protocol) and a memory device using the second memory controller may be slower than the communication between a first memory device 810 and the host using the first memory controller.

The host 850 may use a page cache for the second memory pages. When using the page cache, traffic, with respect to the second memory device 820, may decrease and the performance of memory allocation may be increased. An operation based on operations 324 to 326 briefly described with reference to FIG. 3 is described below.

For example, the OS memory manager 861 in the operating system 860 may request a memory page from the memory page cache 862 (e.g., a CXL page cache). When the memory page cache 862 has a pre-allocated memory page, the memory page cache 862 may provide a memory page to the OS memory manager 861. The memory cache filler daemon 863 may periodically perform a fill operation on a cache in the background. The memory cache filler daemon 863 may periodically request allocation of a memory page from the second memory device 820 via the host 850.

The operating system 860 may maintain the memory page cache 862. The memory page cache 862 may store a designated number of pre-allocated memory normal pages. Meanwhile, a physical memory area corresponding to the page stored in the memory page cache 862 may be reserved for page caching in the second memory device 820. When the OS memory manager 861 attempts to allocate a memory page during page fault handling, the memory page may be retrieved from the memory page cache 862. A request by the second memory page for the second memory device may decrease and/or may be omitted. To maintain the cache being filled, a background software thread (e.g., a memory cache filler or the memory cache filler daemon 863) may operate in the background. The memory cache filler daemon 863 may periodically request one or more pages from the second memory device 820.

Accordingly, although the memory allocation is still synchronized with the second memory device 820, an interaction between the host 850 and the second memory device 820 may decrease or may be removed. The size of a page cache and a request frequency of a filler thread may be set by a user to satisfy a specific workload.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable-gate-array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules to perform the operations of the above-described examples, or vice versa.

As described above, although the examples have been described with reference to various drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A memory device comprising:

a memory processing unit configured to receive a memory access request including a first physical memory address based on a first page size from a host, translate the first physical address based on the first page size into a second physical address based on a second page size that is smaller than the first page size, and access memory cells of the memory device using the second physical address.

2. The memory device of claim 1, wherein the first page size is a huge page size, and the second page size is a normal page size that is smaller than the huge page size.

3. The memory device of claim 1, wherein the first physical address comprises a physical frame number (PFN) based on the first page size, and a first page offset based on the first page size.

4. The memory device of claim 1, wherein the memory processing unit is further configured to generate tag data using a portion of a first page offset of the first physical address and a physical frame number (PFN) of the first physical address, based on the first page size.

5. The memory device of claim 4, wherein the memory processing unit is further configured to generate the tag data further based on a process identifier executed by an operating system in addition to the portion of the first page offset and the PFN.

6. The memory device of claim 4, wherein the memory processing unit is further configured to determine a device PFN (DPFN) using a page table entry (PTE) found in an internal page table of the memory device based on the tag data, and generate the second physical address based on the DPFN.

7. The memory device of claim 1, wherein the memory processing unit is further configured to:
- extract a page offset from the first physical address based on the second page size, and
- determine the second physical address by combining the page offset and a device physical frame number (DPFN).

8. The memory device of claim 1, wherein the memory processing unit is further configured to, when a miss is detected in at least one of a translation lookaside buffer (TLB), a huge page table entry (PTE), or an internal PTE, set up a new internal PTE corresponding to the second physical address in an internal page table of the memory device.

9. The memory device of claim 1, wherein the memory device is configured to receive the memory access request from the host via an external bus based on at least one of a compute express link (CXL) protocol or a peripheral component interconnect (PCI) protocol.

10. The memory device of claim 1, wherein the memory device is configured to reserve a partial area of a memory module for a page cache used by an operating system of the host.

11. A method of operating a memory device, the method comprising:
- receiving a memory access request comprising a first physical address based on a first page size from a host;
- translating the first physical address into a second physical address based on a second page size that is smaller than the first page size; and
- accessing memory cells of the memory device using the second physical address.

12. The method of claim 11, wherein the first page size is a huge page size, and the translating comprises translating the first physical address into the second physical address based on a normal page size that is less than the huge page size.

13. The method of claim 11, wherein the translating comprises:
- determining a first page offset from the first physical address based on the first page size;
- determining a physical frame number (PFN) from the first physical address based on the first page size.

14. The method of claim 11, wherein the translating comprises:
- generating tag data using a portion of a first page offset of the first physical address and a physical frame number (PFN) of the first physical address, based on the first page size.

15. The method of claim 14, wherein the generating of tag data comprises generating the tag data further based on a process identifier executed by an operating system in addition to the portion of the first page offset and the PFN.

16. The method of claim 14, wherein the translating comprises determining a device PFN (DPFN) using a page table entry (PTE) found in an internal page table of the memory device based on the tag data.

17. The method of claim 11, wherein the translating comprises:
- extracting a page offset from the first physical address based on the second page size; and
- determining the second physical address by combining the second page offset and a device physical frame number (DPFN).

18. The method of claim 11, further comprising:
- when a miss is detected in at least one of a translation lookaside buffer (TLB), a huge page table entry (PTE), or an internal PTE, setting up a new internal PTE corresponding to the second physical address in an internal page table of the memory device.

19. The method of claim 11, wherein the memory access request is received from the host via an external bus based on at least one of a compute express link (CXL) protocol or a peripheral component interconnect (PCI) protocol.

20. A memory system comprising:
- a host configured to translate a virtual address into first physical address based on a first page size and issue a memory access request comprising the first physical address; and
- a memory device configured to receive the memory access request from the host, translate the first physical address into a second physical address based on a second page size that is smaller than the first page size in response to the memory request and access memory cells using the second physical address.

* * * * *